US010609246B1

(12) United States Patent
Stanley et al.

(10) Patent No.: US 10,609,246 B1
(45) Date of Patent: Mar. 31, 2020

(54) SYSTEM AND METHOD FOR ASCERTAINING AND PRINTING SUPPLEMENTAL FORMS IDENTIFIED FROM CONTENT OF A SCANNED BASE FORM

(71) Applicant: Toshiba TEC Kabushiki Kaisha, Shinagawa-ku (JP)

(72) Inventors: Devon Stanley, Irvine, CA (US); Phong Huynh, Tustin, CA (US)

(73) Assignee: Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 16/173,464

(22) Filed: Oct. 29, 2018

(51) Int. Cl.
*H04N 1/00* (2006.01)
*H04N 1/32* (2006.01)
*G06F 17/24* (2006.01)
*G06F 3/12* (2006.01)
*G06K 15/02* (2006.01)
*G06K 9/00* (2006.01)

(52) U.S. Cl.
CPC ....... *H04N 1/32122* (2013.01); *G06F 3/1204* (2013.01); *G06F 3/1265* (2013.01); *G06F 17/243* (2013.01); *G06K 9/00442* (2013.01); *G06K 15/1893* (2013.01); *H04N 1/00114* (2013.01)

(58) Field of Classification Search
CPC .......... H04N 1/32122; H04N 1/00114; G06K 9/00442; G06K 15/1893; G06F 3/1204; G06F 17/243; G06F 3/1265

USPC ....................................................... 358/1.15
See application file for complete search history.

(56) References Cited

U.S. PATENT DOCUMENTS

| 7,178,020 | B2 | 2/2007 | DiRienzo |
| 8,726,178 | B2 | 5/2014 | Matulic |
| 9,552,376 | B2 | 1/2017 | Desmond et al. |
| 2010/0235424 | A1* | 9/2010 | Mori ................. G06K 9/00442 709/202 |
| 2016/0364191 | A1* | 12/2016 | Akuta .................... G06F 3/1238 |
| 2016/0381250 | A1* | 12/2016 | Hirai .................... H04N 1/4426 358/1.14 |

* cited by examiner

*Primary Examiner* — Saeid Ebrahimi Dehkordy
(74) *Attorney, Agent, or Firm* — Ulmer & Berne LLP

(57) ABSTRACT

A system and method for ascertaining and printing supplemental forms identified from content of a scanned form includes a multifunction peripheral having an intelligent controller with a processor, memory, a network interface. The MFP includes a print engine and a scan engine operable from instructions issued by the controller. The scanner generates an electronic form document from a scan of tangible form document comprised of user supplied information in a user fillable form. The electronic form document includes content data associated with at least one, preexisting supplemental form that related to the electronic form. A generated electronic document is sent to a server via a network interface, which network interface then receives a supplemental electronic form identified by the server in accordance with the content data. The controller generates a printout of the supplemental electronic form via the print engine.

20 Claims, 4 Drawing Sheets

SYSTEM AND METHOD FOR ASCERTAINING AND PRINTING SUPPLEMENTAL FORMS IDENTIFIED FROM CONTENT OF A SCANNED BASE FORM

TECHNICAL FIELD

This application relates generally to completing and submitting tangible forms. The application relates more particularly to identifying one or more supplemental forms required for submission along with a base form by analysis of content of a filled-out base form.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Information is frequently requested and received by users of user fillable forms, which may be predefined forms. Oftentimes one form may require a submission of one or more additional forms. A determination as to what additional forms may be needed may be contingent on information supplied by a user as they filled out a base form. Thus, a user must determine what is needed to properly fill out the form, and which supplemental forms must be identified, obtained, printed and filled out. Supplemental forms may themselves cause a need for still further supplemental forms.

To be successful in a form filling process, a form creator should specify clearly when and additional information or forms are required along with a base form. This may not be done clearly, or in way that is not confusing to a user. The form consumer should be able to easily identify which supplementary information is necessary for his/her situation, but is not always successful. Ensuring the proper supplementary criteria have been satisfied is a manual and time-consuming process. In many government-based practices, proper form submission is crucial. IRS tax forms, for instance, require multiple auxiliary documents based on the user's financial situation. For example, people with a Health Savings Accounts may be filed to fill out a Form 8889. Failure to identify and complete such additional forms can have severe tax consequences, and may lead to payment of additional taxes or penalties. Health related forms are even more critical as improper or incomplete submissions can lead to further complications, which could be severe.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

In accordance with an example embodiment disclosed herein, an MFP includes an intelligent controller with a processor, memory, a network interface. The MFP also includes a print engine and a scan engine operable from instructions issued by the controller. The scanner generates an electronic form document from a scan of tangible form document comprised of user supplied information in a user fillable form. The electronic form document includes content data associated with at least one, preexisting supplemental form that relates to the electronic form. A generated electronic document is sent to a server via a network interface, which network interface then receives a supplemental electronic form identified by the server in accordance with the content data. The controller generates a printout of the supplemental electronic form via the print engine.

In accordance with example embodiments disclosed herein, a system and method is provided to analyze a scanned form using machine vision and automatically retrieve details that pertains to supplementary documents. The system further identifies which additional documents are necessary based on the data retrieved from the machine vision operation. The system then prints out all supplementary documents for the user. The system is comprised of a local MFP that communicates with an external server. The external server manages the machine vision processing as well as retrieval of supplementary documents.

When the user scans in a form that is supported by the system, the scan data will be sent to the external server for processing. Required supplemental documents will then identified, sent back to the MFP and printed for the user. A system that uses a scanned form to automatically identifies, retrieves and prints supplemental documents that are directly related to the original form.

Figure 1:
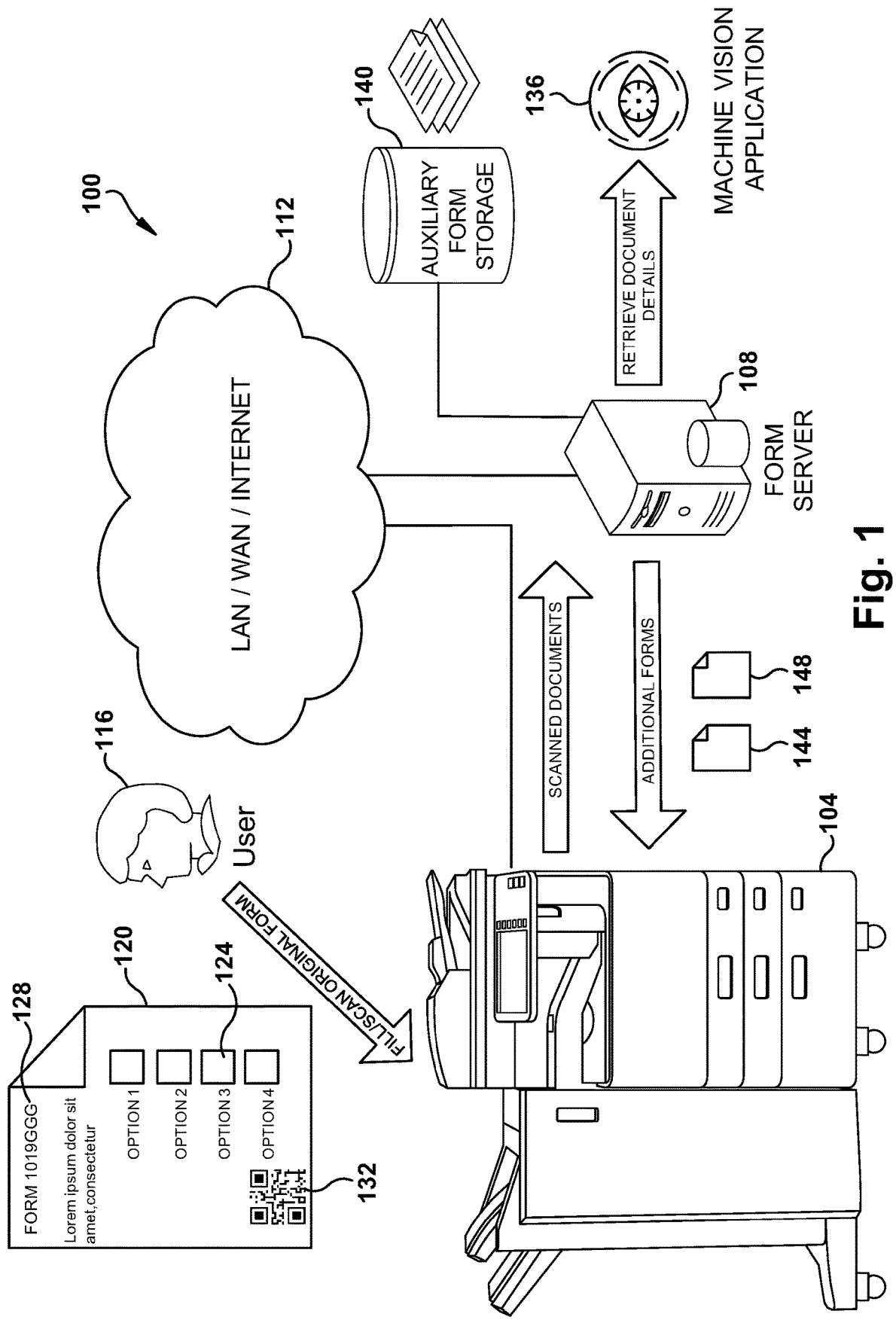
FIG. 1 is an example embodiment of a system for ascertaining and printing supplemental forms identified from content of a scanned form.

In accordance with the subject application, FIG. 1 illustrates an example embodiment of a system 100 for ascertaining and printing supplemental forms identified from content of a scanned form. MFP 104 is in data communication with form server 108 via network cloud 112. Network cloud 112 is suitably comprised of a local area network (LAN), a wide area network (WAN), which may comprised the Internet, or any suitable combination thereof. Data communication is suitably wireless or wired, or any combination thereof. User 116 obtains and completes a tangible form 120, such as a pre-printed form or a form provided on a printout of an electronic file on MFP 104. Form completion may include writing or placement of any suitable indicia on the form 120. This may include selection of a box, such as by checking box 124. Form filling may include written speech in any suitable form, such as with character entry from an alphabet, syllabary or logography. User 116 scans the completed form 120 into a scanner of MFP 104 to generate a corresponding, electronic document which is sent to form server 108.

Form server 108 receives an electronic form scan and determines whether the form is supported. This is suitably done by an optical character recognition (OCR) operation, such as an OCR of form title 128 or decoding of glyph or encoded identification information, such as QR code 132. Matching is suitably completed with existing form information to identify a form. Form server 108 includes machine vision 136 functionality configured to extract relevant character information or graphic information from a received electronic scan form to analyze content. This may include optical character recognition, recognition of checked boxes, recognition of filled circles, or any other suitable determination. Machine vision 136 may also be used to identify a newly received form, although further analysis beyond document identification can be bypassed for unrecognized forms or forms for which no additional analysis need be completed. A suitable machine vision implementation is in connection with OpenCV, an open source machine vision application.

When an electronic form scan document, including preexisting form content or user supplied content, leads to a determination that one or more secondary forms are needed, server 108 identifies each such form and retrieves a corresponding electronic form document from form storage 140. Each retrieved electronic form, supplemental forms 144 and 148 in the illustrated example, are communicated to MFP 104, suitably with a command which would print them immediately, when requested by user 116, or automatically the next time user 116 logs into MFP 104, or any other networked MFP that may be commonly accessible.

Figure 2:
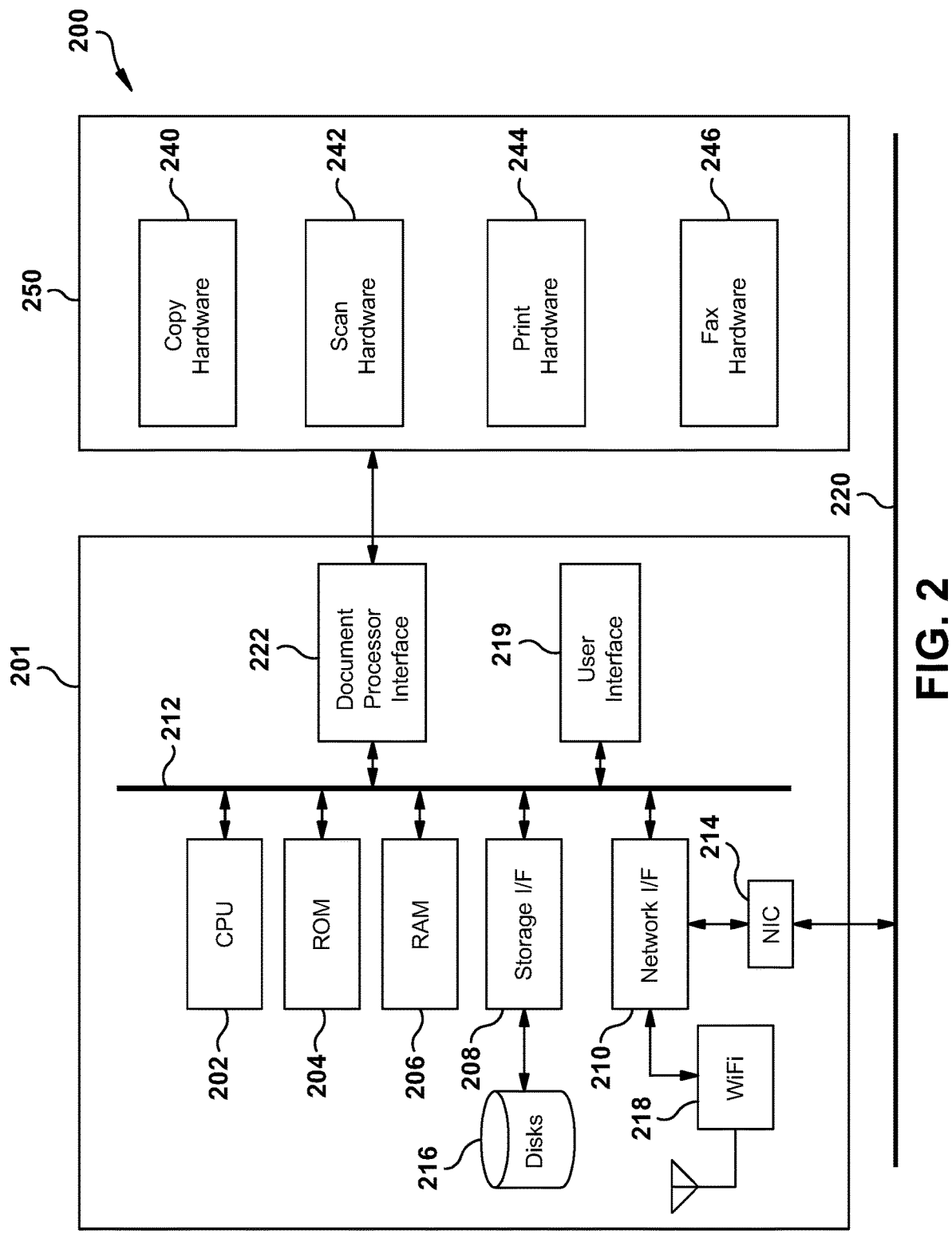
FIG. 2 is an example embodiment of a networked digital device such as a multifunction peripheral.

Turning now to FIG. 2 illustrated is an example embodiment of a networked digital device comprised of document rendering system 200 suitably comprised within an MFP, such as with MFP 104 of FIG. 1. It will be appreciated that an MFP includes an intelligent controller 201 which is itself a computer system. Thus, an MFP can itself function as a cloud server with the capabilities described herein. Included in controller 201 are one or more processors, such as that illustrated by processor 202. Each processor is suitably associated with non-volatile memory, such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like. Processor 202 is also in data communication with user interface 219 for interfacing with displays, keyboards, touchscreens, mice, trackballs and the like.

Processor 202 can also be in data communication with any suitable user input/output (I/O) interface 219 which provides data communication with user peripherals, such as displays, keyboards, mice, track balls, touch screens, or the like.

Also in data communication with data bus 212 is a document processor interface 222 suitable for data communication with MFP functional units. In the illustrated example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Figure 3:
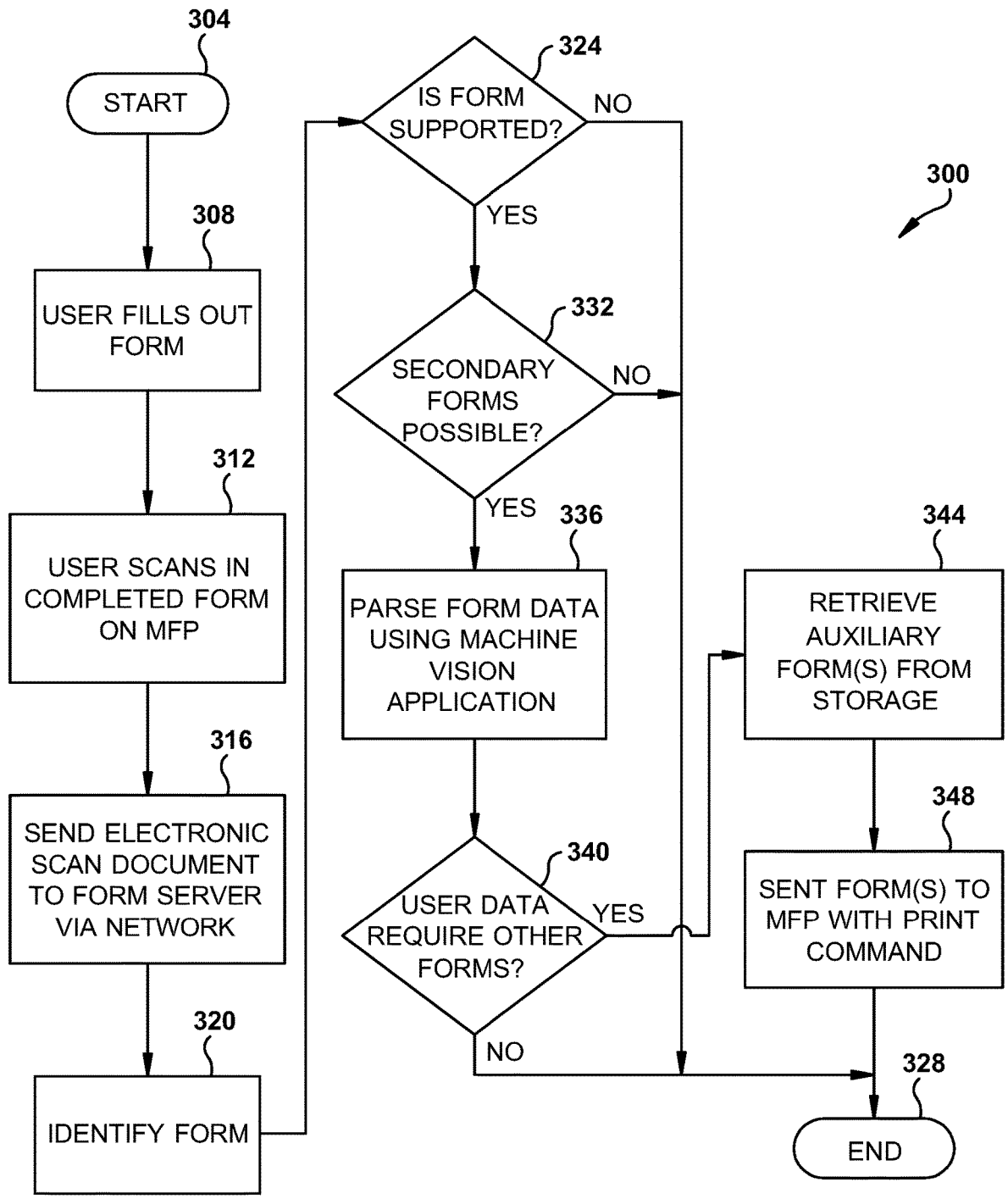
FIG. 3 is flowchart of an example embodiment of a system for ascertaining and printing supplemental forms identified from content of a scanned form.

Turning now to FIG. 3, illustrated is a flowchart 300 of an example embodiment of a system for ascertaining and printing supplemental forms identified from content of a scanned form. The process commences at block 304 and proceeds to block 308 wherein a user fills out a blank form. The user scans the filled out form on an MFP scanner at block 312. The resulting electronic form scan document is sent to a form server at block 316, and the form is identified at block 320. If it is determined at block 324 that the identified form is unsupported, then the process ends at block 328. An optional message may be sent to the user noting that the form is unsupported and a manual check for possible, secondary forms that may be needed should be performed. Certain forms may be supported, but may not be, or no longer are, associated with any secondary forms. If this is determined at block 332, the process ends at block 328, optionally with a notification of such to the user that no secondary forms exist at this time, so they are of no concern in this instance. If one or more secondary forms are possible at block 332, information from the electronic form scan document is parsed at block 336, suitably with a machine vision application. This may include template matching, OCR recognition or any supervised or unsupervised machine learning. If analysis of a parsed document leads to a determination that one or more secondary forms are required at block 340, any such required form is retrieved from storage at block 344 and sent to a user MFP at block 348, optionally with a print command such that a printout of any needed, secondary form occurs automatically. The process then ends at block 328. If it is determined at block 340 that no secondary forms are required, the process proceeds directly to block 328 and ends.

Figure 4:
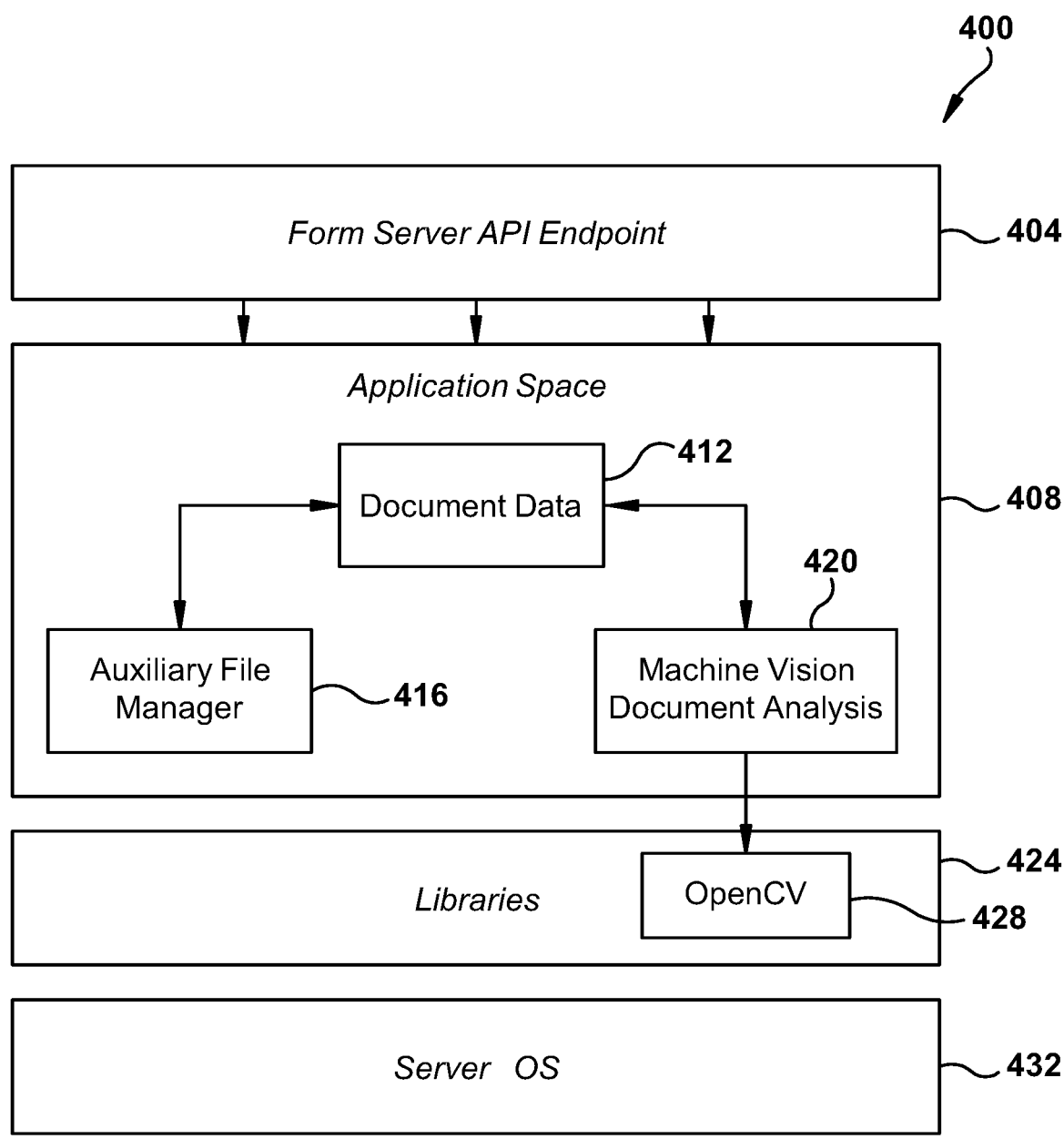
FIG. 4 is an example embodiment of a software module for a form server.

FIG. 4 is example embodiment of a software block diagram 400 for a form server, such as form server 108 of FIG. 1. Module 404 provides a form server application program interface (API) for MFP data communication. API 404 communicates with application space module 408 which includes document data 412 for received scan documents. Machine vision analysis is performed on document data 412 at block 420 for determining auxiliary forms that may be needed via file manager 416, suitably with a call to libraries module 424 for a machine vision application 428, such as with OpenCV. Machine vision 20 on document data 412 determines auxiliary form files to be retrieved via auxiliary file manager 416. The subject modules suitably run in conjunction with operating system module 432.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A multifunction peripheral comprising:
   an intelligent controller including a processor and associated memory;
   a network interface;
   a print engine, operable from instructions issued by the controller, configured to print an electronic document; and
   a scan engine, operable from instructions issued by the controller, configured to generate an electronic form document from a scan of tangible form document comprised of user supplied information in a user fillable form, the electronic form document including content data associated with at least one, preexisting supplemental form related to the electronic form;
   wherein the processor is configured to send a generated electronic document to an associated server via the network interface,
   wherein the network interface is configured to automatically receive a supplemental electronic form identified by the server in accordance with the content data, and
   wherein the controller is configured to automatically generate a printout of the supplemental electronic form via the print engine.

2. The multifunction peripheral of claim 1 wherein the scan engine is configured to receive the tangible document including user supplied indicia added to a preexisting form template.

3. The multifunction peripheral of claim 2 wherein the content data is comprised of the user supplied indicia or the preexisting form template.

4. The multifunction peripheral of claim 3 wherein the content data is comprised of a combination of the user supplied indicia and the preexisting form template.

5. The multifunction peripheral of claim 4 wherein the user supplied indicia is selected from an alphabet, syllabary or logography.

6. The multifunction peripheral of claim 4 wherein the user supplied indicia is comprised of handwritten indicia disposed in a location on the form prescribed by the preexisting form template.

7. The multifunction peripheral of claim 6 wherein the location on the form is comprised of a selection box.

8. A method comprising:
   scanning a tangible, user Tillable, form document including content data associated with at least one, preexisting supplemental form to generate an electronic form document comprised of user supplied information from the user fillable form, the electronic form document including content data associated with at least one, preexisting supplemental form related to the electronic form;
   sending a generated electronic document to an associated server via a network interface;
   automatically receiving a supplemental electronic form identified by the server in accordance with the content data via the network interface; and
   automatically printing the supplemental electronic form via the print engine.

9. The method of claim 8 further comprising receiving the tangible document including user supplied indicia added to a preexisting form template.

10. The method of claim 9 wherein the content data is comprised of the user supplied indicia or the preexisting form template.

11. The method of claim 10 wherein the content data is comprised of a combination of the user supplied indicia and the preexisting form template.

12. The method of claim 11 wherein the user supplied indicia is selected from an alphabet, syllabary or logography.

13. The method of claim 11 wherein the user supplied indicia is comprised of handwritten indicia disposed in a location on the form prescribed by the preexisting form template.

14. The method of claim 13 wherein the location on the form is comprised of a selection box.

15. A system comprising:
   a processor and associated memory; and
   a network interface configured to receive an electronic form document from an associated multifunction peripheral, the electronic form document comprised of user supplied information from a scanned, predefined user fillable form,
   wherein the processor is configured to commence a machine vision analysis of content of a received electronic form document,
   wherein the processor is further configured to identify at least one, preexisting supplemental form related to the electronic form document in accordance with a completed machine vision analysis,
   wherein the processor is further configured to automatically retrieve each identified, preexisting supplemental form from storage, and
   wherein the processor is further configured to automatically send each identified, preexisting document to the multifunction peripheral via the network interface.

16. The system of claim 15 wherein the processor is further configured to identify the at least one, preexisting form in accordance in accordance with content of the user fillable form or user supplied information added to the user fillable form.

17. The system of claim 16 wherein the processor is further configured to identify the at least one, preexisting form in accordance in accordance with both content of the user fillable form and user supplied information added to the user fillable form.

18. The system of claim 17 wherein the user supplied information is comprised of handwritten indicia added to a tangible rendering of the user fillable form.

19. The system of claim 18 wherein the handwritten indicia corresponds to an alphabet, syllabary or logography.

20. The system of claim 18 wherein the handwritten indicia is comprised of user supplied indicia to a check box present on the tangible rendering of the user fillable form.

\* \* \* \* \*